(12) United States Patent
Funk et al.

(10) Patent No.: US 11,552,340 B2
(45) Date of Patent: *Jan. 10, 2023

(54) APPARATUS AND SYSTEM FOR PROVIDING DEVICE CONFIGURATION VIA A BATTERY

(71) Applicant: HUSQVARNA AB, Huskvarna (SE)

(72) Inventors: Jon Funk, Concord, NC (US); Eric Tse, Charlotte, NC (US); Matthew Albinger, Shelby, NC (US); Duncan K. Burns, Jr., Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,104

(22) Filed: Oct. 12, 2021

(65) Prior Publication Data

US 2022/0029213 A1 Jan. 27, 2022

Related U.S. Application Data

(63) Continuation of application No. 16/079,266, filed as application No. PCT/IB2017/051047 on Feb. 23, 2017, now Pat. No. 11,165,104.

(60) Provisional application No. 62/299,708, filed on Feb. 25, 2016.

(51) Int. Cl.
*H01M 10/42* (2006.01)
*H01M 50/267* (2021.01)
*H01M 10/48* (2006.01)

(52) U.S. Cl.
CPC ... *H01M 10/4257* (2013.01); *H01M 10/4207* (2013.01); *H01M 10/488* (2013.01); *H01M 50/267* (2021.01); *H01M 2010/4278* (2013.01); *H01M 2220/30* (2013.01)

(58) Field of Classification Search
None
See application file for complete search history.

(56) References Cited

U.S. PATENT DOCUMENTS

| 5,771,448 A | 6/1998 | Cooper |
| 7,233,126 B2 | 6/2007 | Tashiro |
| 2005/0001586 A1 | 1/2005 | Tashiro |

(Continued)

FOREIGN PATENT DOCUMENTS

| WO | 97/01890 A1 | 1/1997 |
| WO | 2008/134358 A1 | 11/2008 |
| WO | 2009/070663 A1 | 6/2009 |

OTHER PUBLICATIONS

International Search Report and Written Opinion for International Application No. PCT/IB2017/051047 dated May 24, 2017.

(Continued)

*Primary Examiner* — Carmen V Lyles-Irving
(74) *Attorney, Agent, or Firm* — Burr & Forman LLP

(57) ABSTRACT

A battery pack may be configured to power any of a plurality of different outdoor power equipment device types. The battery pack may include one or more rechargeable battery cells configured to power a device to which the battery pack is operably coupled, and processing circuitry. The processing circuitry may include at least a processor and memory. The processing circuitry may be configured to enable configuration of the device or another device of a same device type as the device based on a set of configuration settings stored in the memory.

20 Claims, 5 Drawing Sheets

(56) References Cited

U.S. PATENT DOCUMENTS

2007/0240892 A1 10/2007 Brotto et al.
2007/0244471 A1 10/2007 Malackowski
2015/0072741 A1 3/2015 Suresh et al.

OTHER PUBLICATIONS

International Preliminary Report on Patentability for International Application No. PCT/IB2017/051047 dated Aug. 28, 2018.

APPARATUS AND SYSTEM FOR PROVIDING DEVICE CONFIGURATION VIA A BATTERY

TECHNICAL FIELD

Example embodiments generally relate to battery technology and, more particularly, relate to a battery that is useable in a plurality of different tools and can provide configuration settings for such devices.

BACKGROUND

Property maintenance tasks are commonly performed using various tools and/or machines that are configured for the performance of corresponding specific tasks. Certain tasks, like cutting trees, trimming vegetation, blowing debris and the like, are typically performed by hand-held tools or power equipment. The hand-held power equipment may often be powered by gas or electric motors. Similarly, walk-behind and ride-on outdoor power equipment are used for specific tasks like lawn mowing, tilling, etc., and these devices can have gas or electric motors.

Until the advent of battery powered electric tools/vehicles, gas powered motors were often preferred by operators that desired, or required, a great deal of mobility. Accordingly, many outdoor power equipment devices are powered by gas motors because they may be required to operate over a relatively large range. However, as battery technology continues to improve, the robustness of battery powered equipment has also improved and such devices have increased in popularity.

The batteries employed in outdoor power equipment may, in some cases, be removable and/or rechargeable assemblies of a plurality of smaller cells that are arranged together in order to achieve desired output characteristics. The groups of smaller cells may be located or housed within a housing to form a battery pack. The battery pack may have physical and electrical design characteristics that determine which devices can be powered by the battery pack. In the past, specific unique battery packs have often been employed for each specific different type of outdoor power equipment or for different brands. Thus, each household or business may have substantially an equal number of battery packs to the number of devices that are powered by such battery packs. This can consume more storage space, and also typically means that a diverse array of different battery chargers is also necessary.

Thus, there is a desire to reduce the diversity of battery pack designs used to power outdoor power equipment.

BRIEF SUMMARY OF SOME EXAMPLES

Some example embodiments may provide a battery pack that is capable of being used with a plurality of different types of power tools/vehicles such as outdoor power equipment. However, example embodiments may further provide the capability for the battery pack to be the mechanism by which various configuration settings for each device can be saved and provided to the device in which the battery pack is being used. Thus, for example, every device that the battery pack can power may be personalized by a particular operator so that the operator can merely install the battery pack into each device and have the device automatically configured according to his/her preferences. The battery pack can learn or be programmed with configuration settings or preferences and carry such settings to each device with which the battery pack is compatible.

In one example embodiment, a battery pack is provided. The battery pack may be configured to power any of a plurality of different outdoor power equipment device types. The battery pack may include one or more rechargeable battery cells configured to power a device to which the battery pack is mated, and processing circuitry. The processing circuitry may include at least a processor and memory. The processing circuitry may be configured to enable configuration of the device or another device of a same device type as the device based on a set of configuration settings stored in the memory.

In another example embodiment, an outdoor power equipment device is provided. The device includes an electric motor, a working element operably coupled to the electric motor to be powered by the electric motor, and a battery pack configured to power the electric motor when the battery pack is installed in the device and to power any of a plurality of different outdoor power equipment device types when installed therein. The battery pack may include one or more rechargeable battery cells configured to power a device to which the battery pack is mated, and processing circuitry. The processing circuitry includes at least a processor and memory. The processing circuitry is configured to enable configuration of the device or another device of a same device type as the device based on a set of configuration settings stored in the memory.

Some example embodiments may improve the user experience and/or the efficacy of battery powered equipment.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
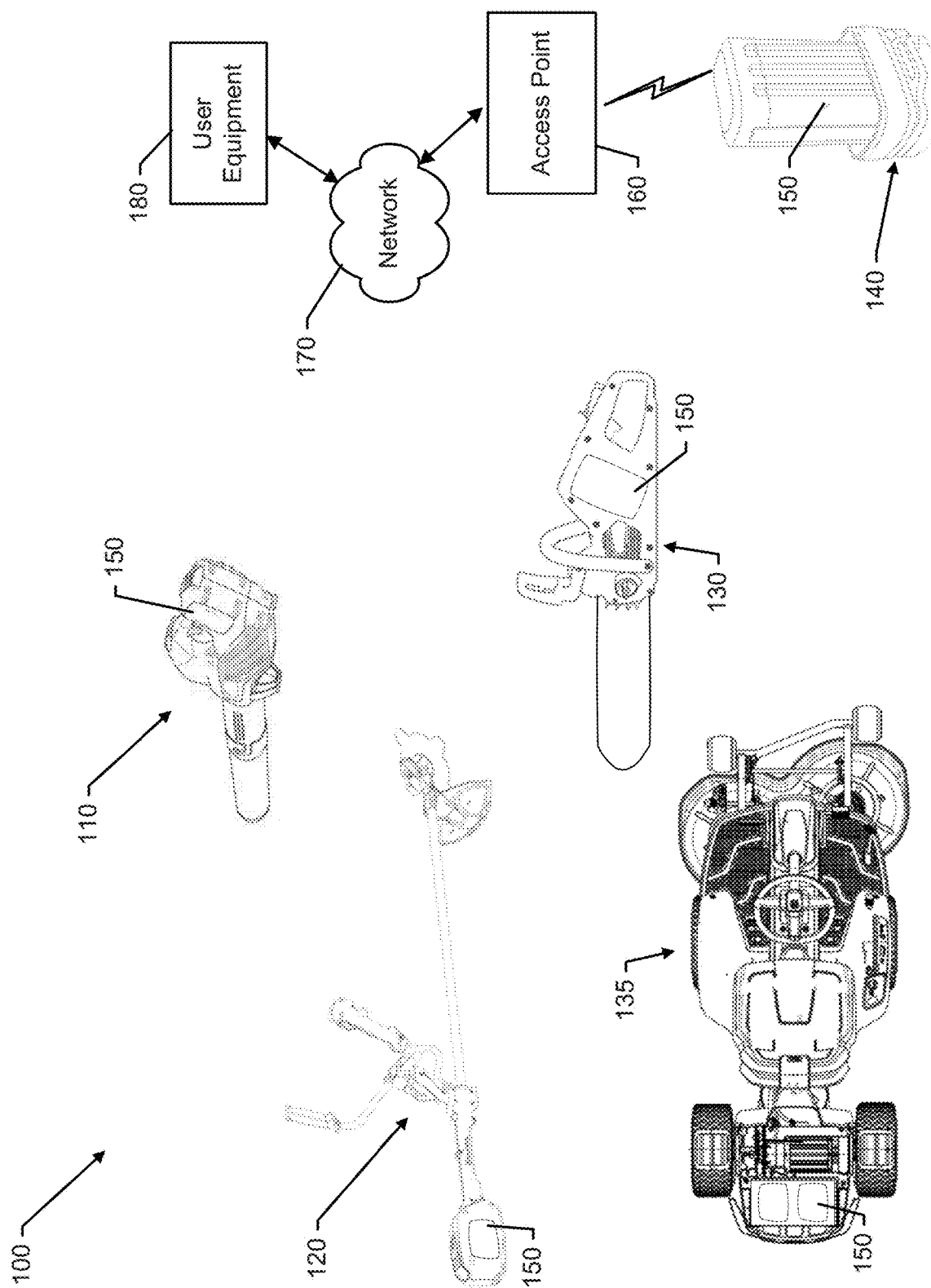
FIG. 1 illustrates a concept diagram of a system in which a personalizable battery may operate in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection or interaction of components that are operably coupled to each other.

Some example embodiments may provide for a battery pack that can be useful in connection with battery powered tools or vehicles that may generally be referred to as battery powered outdoor power equipment. Outdoor power equipment that is battery powered, and battery powered tools generally, typically include battery packs that have a given voltage or power rating, and have physical characteristics that must match the receptacle of the device that is to be powered. In order to achieve sufficient power, cells of the battery pack may be organized and interconnected (e.g., in an arrangement of series and/or parallel electrical connections) to group the cells within the battery pack in a manner that achieves desired electrical characteristics. The battery pack may be inserted into an aperture (e.g., a receptacle) of the piece of equipment that is to be powered so that the corresponding piece of equipment (e.g., hand-held, ride-on, or walk-behind outdoor power equipment) is enabled to be mobile. However, in some cases, the battery pack may be inserted into a backpack or other carrying implement that the equipment operator may wear, and the backpack may have an interface portion to be inserted into the aperture of the piece of equipment.

The battery pack is typically rechargeable, and may generate heat during charge and/or discharge due to the electrochemical reactions that are employed to produce electricity. Thus, the battery packs and/or their chargers may sometimes incorporate cooling assemblies for preventing heat generation from becoming excessive, and damaging the cells of the battery pack. Accordingly, it should be appreciated that the battery pack generally needs to have a physical structure that supports the cells of the battery pack and cooling equipment (if employed), and that physical structure needs to further incorporate electrical contacts that allow the battery pack to be operably coupled to the electric motor of the device being powered and to the charger that will recharge the battery pack. To make the battery pack suitable for use with a plurality of different types of devices (including outdoor power equipment and chargers), the devices themselves must have consistently designed apertures or other battery receptacles that correspond to the physical characteristics of the battery pack. Alternatively, adaptors may be employed to adapt the battery pack to use with each respective different device it can power. As such, the electrical contacts of the different types of devices must also be suitable for coupling with the contacts of the battery pack (or its adaptor) when the battery pack (or adaptor) is inserted into the respective different types of devices.

Example embodiments are directed to a battery pack that has a physical structure that enables the battery pack to be used with a plurality of different types of devices. However, example embodiments further enable the battery pack to include a communication capability that enables processing circuitry on or associated with the battery pack to be used to communicate with processing circuitry on or associated with the device being powered so that the battery pack can extract configuration settings from and/or provide configuration settings to the device being powered by the battery pack. Furthermore, in some cases, the battery pack may include communications circuitry that enables the configuration settings to be communicated to/from one or more network devices. As such, the battery pack is essentially connected and connectable to network devices that may allow the operator to program configuration settings "off line" instead of directly when the battery pack is connected to the device being powered. Configuration settings may therefore be defined on a real time or post hoc basis. The configuration settings may be stored in a profile that is directly associated with one or more operators, and thus, multiple profiles could alternatively or also be provided for a single battery pack. The profiles could be shared between battery packs and/or operators, and in some cases, the battery pack may employ a selected profile based on a number of possible selection criteria that may be available to the battery pack upon installation of the battery pack into a device. Thus, the battery pack may essentially be a personalization tool for the operator to ensure that each device the operator uses is personalized with the configuration settings the operator prefers.

FIG. 1 illustrates a concept diagram of a system 100 in which a personalized battery of an example embodiment may operate. As shown in FIG. 1, the system 100 includes a plurality of individual pieces of outdoor power equipment including a first device 110, a second device 120, a third device 130, and a fourth device 135. Each of the first, second, third and fourth devices 110, 120, 130 and 135 includes at least an electric motor, a working element powered by the electric motor, and a battery pack as described herein. The system 100 also includes a charger 140 for charging the battery pack, which is a personalizable battery 150 of an example embodiment. In some cases, the system 100 may further include an access point 160. The access point 160 may enable the charger 140 and/or the personalizable battery 150 to be operably coupled to a network 170 to which user equipment 180 may be connected.

In the pictured example, the first device 110 is a blower, the second device 120 is a trimmer, the third device 130 is a chainsaw, and the fourth device 135 is a riding lawn mower. However, these three example devices are merely shown to illustrate the potential for interoperability of the personalizable battery 150 with a plurality of different types of devices in the outdoor power equipment context. Thus, other pieces of outdoor power equipment could be substituted or added in other examples. For example, string trimmers, hedgers, walk-behind lawn mowers or other devices could be utilized in connection with other example embodiments. Any battery powered piece of outdoor power equipment that can be operably coupled to the personalizable battery 150 for both power provision purposes and communication purposes, as described herein, could be part of the system 100, and the system 100 could include as few as a single device or as many as dozens of devices.

Additionally, the fact that four devices that could be powered by the personalizable battery 150 are shown is merely illustrative of the potential for multiplicity relative to the number of devices that the personalizable battery 150 can power. Each of the devices may be powered by a single instance (i.e., the same) personalizable battery 150 at respective different times. However, in some cases, a number of different instances of the personalizable battery 150 can communicate with the access point 160 and be used to power the different devices. Each such personalizable battery could, in such an example, have one or more different users (and their preferred configuration settings) associated therewith. It should further be appreciated that one instance of the personalizable battery 150 could be charged using the charger 140, and that same instance of the personalizable battery 150 could power each respective different one of the first, second, third and fourth devices 110, 120, 130 and 135 in any order after being charged. After charge depletion, the instance of the personalizable battery 150 could be recharged at the charger 140. Alternatively, separate instances of the personalizable battery 150 could power each respective one of the first, second, third and fourth devices 110, 120, 130 and 135 while a fifth instance of the personalizable battery 150 is charging at the charger 140. Such different instances could then swap with respect to powered devices as the operators to which each instance belongs switches to respective different devices.

In the example in which a single instance of the personalizable battery 150 is used with each device, the single instance of the personalizable battery 150 may, in some cases, communicate with the access point 160 while being charged on the charger 140 (or even while powering such devices, in some cases). Meanwhile, in an example in which multiple instances of the personalizable battery 150 are employed to power respective ones of the first, second, third and fourth devices 110, 120, 130 and 135, each such instance may communicate with the access point 160 while being charged on respective different chargers simultaneously or in sequence via the charger 140. The personalizable battery 150 is shown communicating with the access point 160 while being charged by the charger 140. However, it should be appreciated that the personalizable battery 150 may also communicate with the access point 160 when not installed or being charged in some alternative examples.

In some cases, the personalizable battery 150 could be used in different ones of the first, second, third and fourth devices 110, 120, 130 and 135 at respective different times and extract configuration settings and/or operating parameters from each respective device while installed therein. The extracted configuration settings and/or operating parameters may be representative of the preferred settings selected by the user, or indicative of the operating pattern(s) employed by the user. The configuration settings may include power settings, user identification, volume settings (e.g., for alarms, notifications, stereo speakers, etc.), communication or radio channels, blade height, trimmer angle, handle configuration, seat configuration, display settings, and/or the like. Thus, for example, the user may install the personalizable battery 150 into one of the devices and the personalizable battery 150 may determine the device type and/or specific device identity. The personalizable battery 150 may then record the current settings and any changes made by the user to adjust those settings. When the personalizable battery 150 is removed, the last set of current settings may be stored at the personalizable battery 150 (or at the network 170 or the user equipment 180). Then the next time the personalizable battery 150 (or another instance that has downloaded the settings from the network 170) is installed in the device (or a device of the same type), the last set of current settings may be duplicated to automatically configure the device in the manner the user had last used to configure the device.

In some cases, however, the configuration of the device may not necessarily merely duplicate the last set of current settings. Instead, the operating parameters of the last usage may impact or otherwise be used to select the configuration of the device. For example, operating parameters such as power output, the start/stop number, rate of discharge, state of charge after use, speed settings employed, and/or the like may be recorded. Based on these operating parameters from prior usage (either a single usage, or statistics indicative of performance over multiple prior uses), the configuration settings for the device may be selected when the personalizable battery 150 is installed. Thus, for example, if the user has a history of leaving the battery in a low state of charge or of rapidly discharging the battery, the settings may be selected to slow the user's battery power consumption or maximize the efficiency of the device for the characteristics of use by the user. Alternatively or additionally, safety settings could be selected based on operating parameters from prior usage.

Thus, for example, configuration settings or operating parameters may be stored locally at the personalizable battery 150, or stored in the network 170 or at the user equipment 180, and the configuration settings may be duplicated at a device of the same type (or the same device) for the same user, or configuration settings may be determined based on the operating parameters, or a combination of duplication and determination may be accomplished using the personalizable battery 150.

It should also be appreciated that the personalizable battery 150 may have different triggers or stimuli that cause the personalizable battery 150 to communicate with the access point 160 (if applicable) and/or the device being powered by the personalizable battery 150. In some cases, initiation of connection of the personalizable battery 150 with a device (e.g., the first, second, third or fourth devices 110, 120, 130 or 135, or the charger 140) may trigger communication. Alternatively or additionally, termination of connection may trigger communication, or various time or event based triggers may cause the personalizable battery 150 to trigger communication and extract data or install configuration settings.

Once data (such as the operating parameters or last set of current configuration settings) has been extracted from devices to which the personalizable battery 150 is operably coupled and has been operably coupled, the data may be stored locally at the personalizable battery 150 or at the user equipment 180 and/or the network 170. The network 170 may therefore be a local area network, or a wide area network (e.g., the Internet), and the user equipment 180 could be a personal computer or laptop, a smart phone or tablet, a server, or any of a number of other such devices. The access point 160 may communicate with the charger (or devices) via short range wireless communication (e.g., Bluetooth, WiFi, and/or the like), and the access point 160 may have a wired or longer range wireless connection to the network 170 and/or to the user equipment 180. Moreover, in some cases, if the user equipment 180 has, for example, Bluetooth communication capabilities, the user equipment 180 could actually act as the access point 160. Thus, for example, in some cases, the access point 160 could be a communication node that provides a gateway to the network 170 so that user equipment that is capable of communication with the network 170 can interface with the personalizable battery 150 and the devices (via the personalizable battery 150). However, in other cases, the access point 160 could be a smart phone with Bluetooth capability and the user can interact directly with the personalizable battery 150 without other network resources therebetween to download or upload configuration settings via a graphical user interface designed to facilitate such activity.

Figure 2:
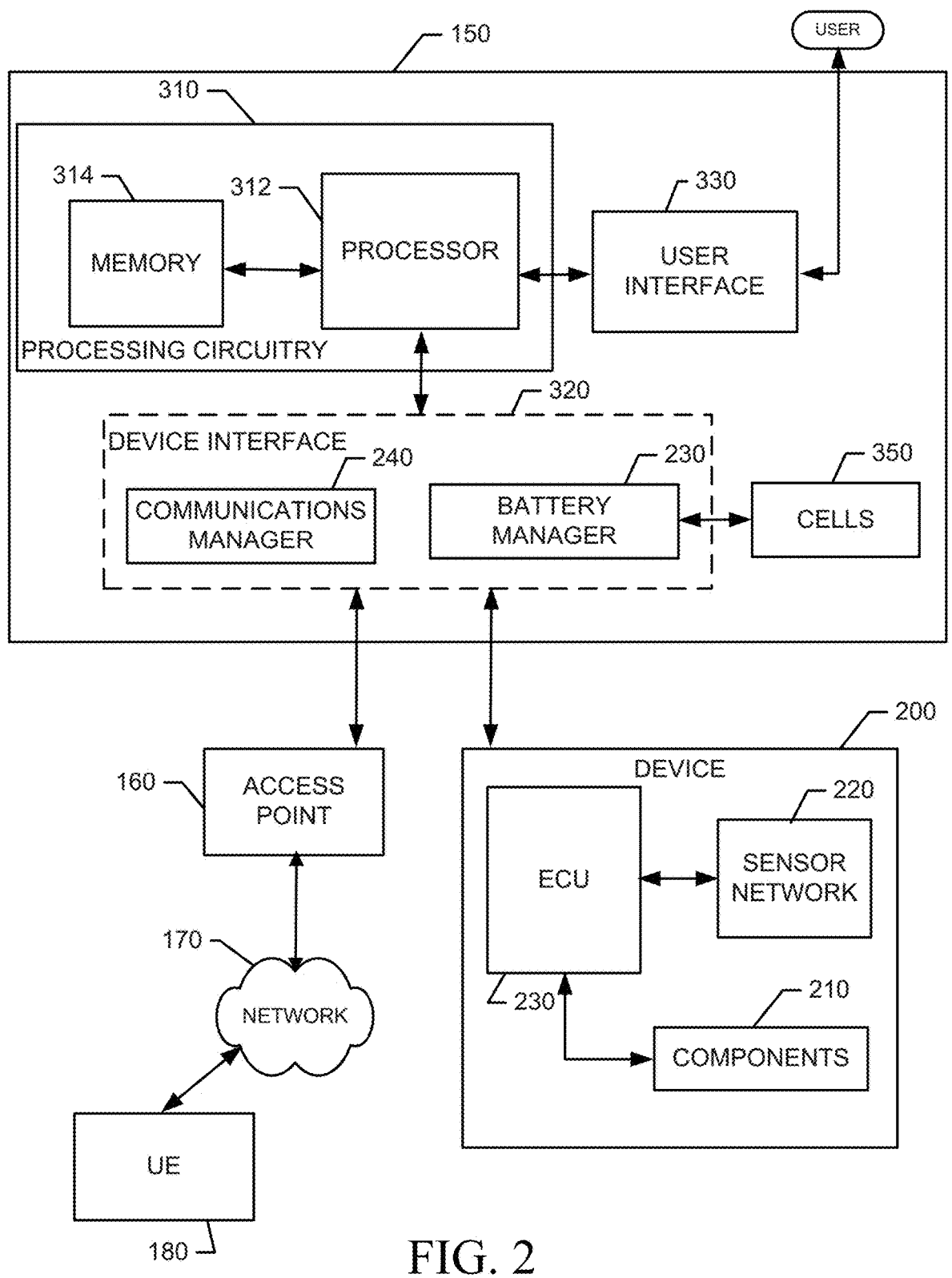
FIG. 2 illustrates a block diagram of circuitry for accomplishing two levels of connectivity for a personalizable battery in accordance with an example embodiment.

As may be appreciated from the discussion above, the personalizable battery 150 includes circuitry to enable the batteries of the personalizable battery 150 to be charged (e.g., by the charger 140) and to enable the power from the batteries to be delivered to the devices being powered by the personalizable battery 150, and also includes communication circuitry to support communication with the access point 160 and/or with a device 200 (e.g., any of the first, second, third and fourth devices 110, 120, 130 or 135) as shown in FIG. 2. Thus, the personalizable battery 150 is configured to be operably coupled to the device 200 on two levels. First, there is a power transfer communication level of connectivity, and secondly there is a data communication level of connectivity. As such, the personalizable battery 150 can, for example, both provide power to a device 200 and communicate with the device 200 to extract configuration settings and/or operating parameters and to provide configuration settings to the device 200. In some cases, the personalizable battery 150 is configured to extract information about the operation of the device 200 (e.g., the operating parameters) that are either related to positioning, configuration or operation of components 210 of the device 200, or that are related to configuration settings currently set for the device 200. In either case, some of the information extracted may be obtained directly or indirectly from a sensor network 220 of the device 200. The sensor network 220 may include one or more sensors that are positioned relative to the components 210 to determine various configuration settings of such components 210. Thus, the sensors may detect, for example, the angle at which working assembly components are fixed, the height of various components, current draw, power levels, volume settings, state of charge, start/stop number, and/or the like. In some cases, the components 210 and/or the sensor network 220 may communicate with the electronic control unit (ECU) 230 of the device 200 and the personalizable battery 150 may extract information from and provide information to the ECU 230 to enable the ECU 230 to interact with the components 210 and/or the sensor network 220 to achieve the configuration settings defined by the personalizable battery 150.

As can be appreciated from the description above, the personalizable battery 150 may be configured to simultaneously power the device 200, manage that power provision, extract information from the device and provide configuration settings to the device 200. Moreover, the personalizable battery 150 may connect the device to a local and/or remote network via which a user may be enabled to review and/or modify configuration settings remotely by interacting with the personalizable battery 150 to adjust configuration settings for the device 200 for the next time the personalizable battery 150 is installed in the device 200. Thus, the personalizable battery 150 can enable the user to duplicate last used settings for the device 200 or modify settings when the personalizable battery 150 is not even connected to the device 200. The user can therefore appreciate certain performance characteristics of the devices (or operators thereof) or otherwise interact with such devices to enhance maintenance, management or otherwise enhance the user experience.

As shown in FIG. 2, the device 200 (which could be any of the first, second, third and fourth devices 110, 120, 130 and 135 of FIG. 1) is operably coupled to the personalizable battery 150 via power provision circuitry. In some cases, the power provision circuitry may be embodied as electrical contacts that mate with each other when the personalizable battery 150 is inserted fully into a battery receptacle of the device 200. The power provision circuitry may enable the cells of the personalizable battery 150 to be coupled to the electric motor of the device 200.

The ECU 230, which may include processing circuitry for controlling various components of the device 200, may control a working assembly (e.g., a blade, mobility assembly, trimmer head, and/or electric motor) of the device 200 and may also gather data (e.g., operating parameters) from various sensors of the sensor network 220 of the device 200. The ECU 230 may also receive operating parameters and/or configuration setting information regarding the components 210 directly from such components in some cases. In situations where the personalizable device 150 provides configuration settings to the device 200, such settings may be provided to the ECU 230, and the ECU 230 may initiate or otherwise control/direct initiation of the configuration settings provided.

The personalizable battery 150 may include a battery manager 230 configured to manage the power transfer communication level of connectivity between the device 200 and the personalizable battery 150, and a communications manager 240 configured to manage data communication level of connectivity between the device 200 and the personalizable battery 150. As part of managing power transfer, the battery manager 230 may institute safe guards or otherwise manage charge/discharge activities based on configuration settings provided by the personalizable battery 150. However, the battery manager 230 may also monitor some of the operating parameters (e.g., those related to current draw, output power and/or the like) directly at the personalizable battery 150 instead of having to receive such information from the device 200 via the communications manager 240 (although the device 200 could provide such information, or corroborate such information in some cases).

Of note, although the communications manager 240 and the battery manager 230 are shown as separate entities in FIG. 2, it should be appreciated that they may be embodied on the same or different physical components in various example embodiments. Thus, for example, in some cases, the battery manager 230 may be embodied on a single chip having its own processor and/or processing circuitry and the communications manager 240 may be embodied by a separate chip having separate processor and/or processing circuitry resources. However, in still another example, the personalizable battery 150 may have a single processing chip that may be configured to act as both the battery manager 230 and the communications manager 240. Thus, for example, operational parameters and configuration settings could pass over a single communication interface or bus in some cases.

As further shown in FIG. 2, the personalizable battery 150 may include processing circuitry 310 of an example embodiment as described herein. In this regard, for example, the personalizable battery 150 may utilize the processing circuitry 310 to provide electronic control inputs to one or more functional units of the personalizable battery 150 and to process data received at or generated by the one or more functional units regarding various indications of device activity (e.g., operating parameters and/or configuration settings) relating to a corresponding one of the devices 200 and/or a particular user (or user identity). In some cases, the processing circuitry 310 may be configured to perform data processing, control function execution and/or other processing and management services according to an example embodiment. As such, the processing circuitry 310 may be configured to manage extraction, storage and/or communication of data received or generated at the processing circuitry 310.

In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control other components or modules that interface with the processing circuitry 310. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of an on-board computer housed in a battery pack with the battery manager 230 and/or the communications manager 240 to control operation of the personalizable battery 150 relative to its interaction with other devices.

Although not required, some embodiments of the personalizable battery 150 may employ a user interface 330. The user interface 330 may be in communication with the processing circuitry 310 to receive an indication of a user input at the user interface 330 and/or to provide an audible, visual, tactile or other output to the user. As such, the user interface 330 may include, for example, a display, one or more switches, lights, buttons or keys (e.g., function buttons), and/or other input/output mechanisms. In an example embodiment, the user interface 330 may include one or a plurality of colored lights or a simple display to indicate charge status or other relatively basic information. However, more complex interface mechanisms could be provided in some cases. Alternatively or additionally, the user interface 330 could be embodied remotely, such as at another device of the network 170, or at the user equipment 180.

Figure 3:
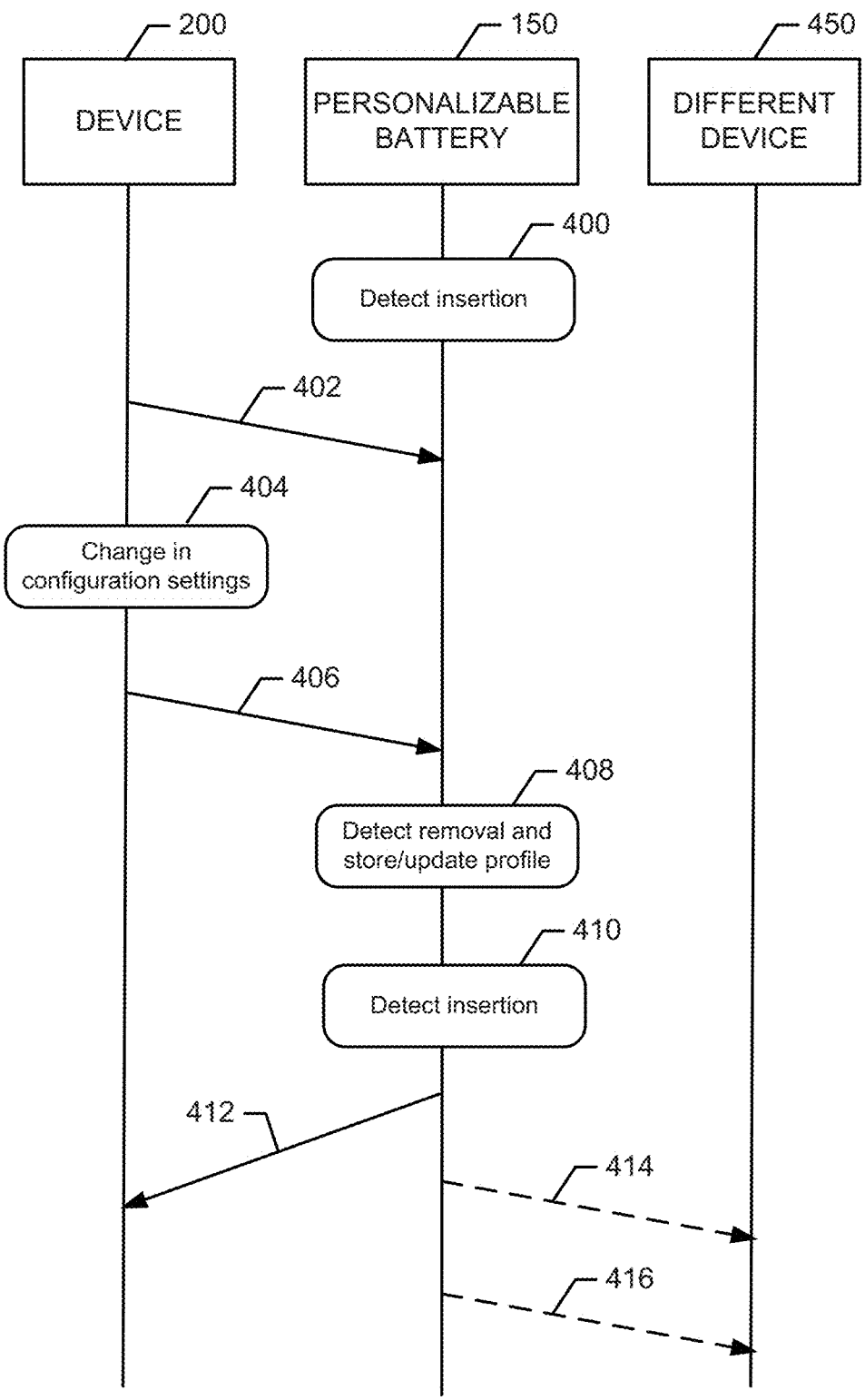
FIG. 3 illustrates a control flow diagram for operation of the personalizable battery in the same or a different device in accordance with an example embodiment.

As shown in FIG. 2, the battery manager 230 and the communications manager 240 may be embodied as or otherwise be controlled by the processing circuitry 310. However, in some cases, the processing circuitry 310 may be associated with only a specific one of the battery manager 230 or the communications manager 240, and a separate instance of processing circuitry may be associated with the other. Yet in some cases, the processing circuitry 310 could be shared between the battery manager 230 and the communications manager 240 and/or the processing circuitry 310 could be configured to instantiate both such entities. Thus, although FIG. 2 illustrates such an instance of sharing the processing circuitry 310 between the battery manager 230 and the communications manager 240, it should be appreciated that FIG. 3 is not limiting in that regard.

Each of the battery manager 230 and the communications manager 240 may employ or utilize components or circuitry that acts as a device interface 320. The device interface 320 may include one or more interface mechanisms for enabling communication with other devices (e.g., device 200, the access point 160, and/or internal components). In some cases, the device interface 320 may be any means such as a device or circuitry embodied in either hardware, or a combination of hardware and software that is configured to receive and/or transmit data from/to components in communication with the processing circuitry 310 via internal communication systems of the personalizable battery 150. With respect to the communications manager 240, the device interface 320 may further include wireless communication equipment (e.g., a one way or two way radio) for at least communicating information from the personalizable battery 150 to the access point 160. As such, the device interface 320 of the communications manager 240 may include an antenna and radio equipment for conducting Bluetooth, WiFi, or other short range communication with the access point 160, or for employing other longer range wireless communication protocols for communicating with the access point 160 in instances where the access point 160 is directly associated with provision of access to a wide area network.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be embodied as, include or otherwise control the operation of the personalizable battery 150 based on inputs received by the processing circuitry 310. As such, in some embodiments, the processor 312 (or the processing circuitry 310) may be said to cause each of the operations described in connection with the personalizable battery 150 in relation to operation the personalizable battery 150 relative to undertaking the corresponding functionalities associated therewith responsive to execution of instructions or algorithms configuring the processor 312 (or processing circuitry 310) accordingly.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. As yet another alternative or additional capability, the memory 314 may include one or more databases that may store a variety of data sets responsive to input from the device 200, or any other functional units or devices from which the personalizable battery 150 has previously extracted data while powering such devices. Among the contents of the memory 314, applications may be stored for execution by the processor 312 in order to carry out the functionality associated with each respective application. In some cases, the applications may include instructions for extraction of configuration settings or operating parameters associated with configuration settings. Additionally or alternatively, the applications may include instructions for the correlation of information extracted with a profile that defines a set of configuration settings associated with a device and/or user. Thus, for example, when the personalizable battery 150 is installed into a particular device, the personalizable battery 150 may determine whether a specific user profile and/or device profile is applicable for the particular device. The personalizable battery 150 may then provide configuration settings in accordance with the user profile or device profile. However, the personalizable battery 150 may also be configured to receive information that may cause the user profile and/or device profile to be modified and store such modified user profile and/or device profile (locally or via the network 170).

In some embodiments, the battery manager 230 may be any means such as a device or circuitry embodied in either hardware, or a combination of hardware and software that is configured to receive and/or transmit battery data (e.g., operating parameters) from/to the device 200. The battery manager 230 may also control and/or provide electrical connections and/or interfaces between the cells 350 of the personalizable battery 150 and the device 200 to monitor power provision parameters and enable the battery manager 230 to implement safety or protective functions as appropriate. The protective functions may be implemented based upon examination of the battery data and comparison of such data to various thresholds or safety limits. Thus, the battery data may, in some cases, be acted upon locally by the battery manager 230. However, alternatively or additionally, the battery data may be provided to the communication manager 240 for transmission to the network 170 (or entities accessible through the network 170). In these and other instances, the battery data may be stored locally prior to such transmission or may be transmitted in real-time (or substantially real-time).

In an example embodiment, the battery manager 230 may receive or generate identification information that correlates the battery data to a specific device (e.g., a specific one of the first device 110, the second device 120, the third device 130, or the fourth device 135), or to users of such devices. Thus, all data may be transmitted and/or stored in association with the identification information so that such data can be associated with its respective device, device type, or user for analytical purposes. The identification information may include a specific device identifier, a type identifier indicating the type or model of the device 200, and/or a specific user identifier. The battery data may include, for example, information indicative of current draw at discrete intervals, continuously, or at discrete times. Temperature data, maximum current, state of charge, and other data related to the state of the cells 350 or other aspects of the devices 200 or personalizable battery 150 relative to current draw or battery performance may also be included in the battery data.

In an example embodiment, the communications manager 240 may be any means such as a device or circuitry embodied in either hardware, or a combination of hardware and software that is configured to receive and/or transmit service data from/to the device 200. The communications manager 240 may also control the storage and/or further communication (e.g., relaying) of operating parameters and/or configuration settings extracted from the device 200. Thus, for example, the operating parameters and/or configuration settings may be extracted from the device 200 to which the personalizable battery 150 is operably coupled during such coupling. The extracted operating parameters and/or configuration settings may, at some point thereafter, be transmitted (e.g., relayed) to the access point 160 for further provision to the network 170 or devices connected to the network 170 such as the user equipment 180, or the extracted operating parameters and/or configuration settings may be stored at the personalizable battery 150 without any need for involvement with the network 170 or components thereof. The operating parameters may include information specific to device performance, at least some of which is not determined based on measuring battery parameters. Thus, for example, the service data may include engine RPM, working assembly RPM, torque, run time or run hours, position, orientation, temperature data, speed data, mode of operation, lubricating oil pressure or level, instances of protective actions, and/or the like. Other information may be obtained from the sensor network 220 to indicate the position and/or orientation of various ones of the components 210 of the device 200.

In some example embodiments, the operating parameters and/or configuration settings may be used for local analysis at the personalizable battery 150 to define a current set of configuration settings for the device 200 (and/or for the user of the device 200). For example, the volume settings for a radio of a riding lawn mower (e.g., the fourth device 135), the cutting deck height, seat position, or various other configuration settings, may be recorded at the personalizable battery 150 for the riding lawn mower (e.g., in a device profile) and/or for a particular user registered to the personalizable battery 150 (e.g., in a user profile) and the next time the personalizable battery 150 is installed into the riding lawn mower, the corresponding configuration settings can be restored or duplicated at the riding lawn mower (or another riding lawn mower of the same type) based on the device profile (e.g., standard configuration settings for the device type) or based on the user profile (e.g., when the same user is using the same type of device). In other cases, such analysis may be performed remotely and provided to the personalizable battery 150.

In examples in which there are not multiple user profiles, a single set of configuration settings may be developed for every different device type that the personalizable battery 150 is capable of powering and therefore interfacing with. Thus, for example, in relation to the system 100 of FIG. 1, configuration settings may be defined for each one of the first, second, third and fourth devices 110, 120, 130 and 135. When the personalizable battery 150 is installed into any of the devices, the personalizable battery 150 may first interface with the ECU 230 of the device 200 to discover the device type. Then, after discovering the device type, the personalizable battery 150 may communicate with the ECU 230 to provide configuration settings to the device 200. If the personalizable battery 150 is removed and installed into another device, the personalizable battery 150 may again discover the new device type and provide the corresponding different configuration settings that apply to the new device type.

In some cases, the personalizable battery 150 may come from the factory with default configuration settings for each or a plurality of different device types. After the first mating of the personalizable battery 150 with one of the devices (e.g., the device 200), the personalizable battery 150 may modify the configuration settings stored in the device profile based on the last current set of configuration settings for the device 200 and update the device profile accordingly. This may be repeated for every device the personalizable battery 150 interfaces with until all device profiles are updated with the last current set of configuration settings. Each withdrawal of the personalizable battery 150 from any device may further cause the device profile to be updated based on the last current set of configuration settings.

The device type may be manually selected by the user in some cases (e.g., via the user interface 330). However, in other cases, a communication protocol may enable the ECU 230 to provide device type information. In still other cases, the device 200 may include a beacon or tag (e.g., an RFID tag) that the communications manager 240 may be enabled to interrogate or otherwise detect to determine the device type.

As an alternative, configuration settings may only be changed if the personalizable battery 150 is shifted into a learning mode. In the learning mode, the personalizable battery 150 may allow the device profiles (or user profiles) to be modified. However, when the personalizable battery 150 is not in the learning mode, the device profiles (or user profiles) may not be changed. In some cases, the personalizable battery 150 may be shifted into and out of the learning mode by a mechanical switch or other component of the user interface 330. However, in other cases, the personalizable battery 150 may only be switched into and out of the learning mode remotely (e.g., via the user equipment 180 or another network component 170) or by taking the personalizable battery 150 to a dealer.

In cases in which the personalizable battery 150 may further tailor configuration settings to a specific user, the personalizable battery 150 may be capable of storing or generating a plurality of user profiles. Each user may interact with the personalizable battery 150 (e.g., via the user interface 330—such as via a button on the personalizable battery 150) to identify themselves to the personalizable battery 150 in a generic way (e.g., as User 1, User 2, etc.), or in a more specific way (e.g., by name, login, an electronic identifier (e.g., a beacon or RFID tag identifier)). Thus, in some cases, the personalizable battery 150 may be enabled to discover the user identity (e.g., by reading a beacon or tag associated with the user) electronically. Electronic discovery may be accomplished via a device pairing protocol that pairs uses to devices. However, in other example embodiments, the personalizable battery 150 may be enabled to discover the user identity via other methods.

The other methods may include weight dependent identity determination. For example, by detecting weight of the user sitting in the seat, an adult user may be distinguished from a child. In such a case, it is possible that the personalizable battery 150 may include an adult user profile (or multiple such profiles) and a child user profile. The device 200 may be completely inhibited from operation based on user identity (by weight), or certain safety or operational restrictions may be employed (via configuration settings) for low-weight operators (i.e., children), while the configuration settings associated with the adult profile may not have such restrictions.

Profile management (e.g., maintaining or updating of user or device profiles) may be accomplished in an active or passive manner. Thus, for example, active management may include the provision of analysis of operating data and/or configuration settings for a given profile relative to various thresholds or other management objectives, which may be programmed and accessible to the communications manager 240. The communications manager 240 may then compare the thresholds or management objectives to the operating data and/or configuration settings currently used on the device 200 to determine (e.g., when the personalizable battery 150 is being removed) whether to dynamically change the configuration settings for applicable profiles. This dynamic updating gives the personalizable battery 150 the ability to actively determine when profile changes should occur to update or change configuration settings to be provided when the personalizable battery 150 is next installed. However, in other cases, the user may be required to indicate a desire to update configuration settings and no profile updates or other changes to the configuration settings may occur unless and until the user directs such changes. In such examples, the personalizable battery 150 is entirely passive.

In some cases, the operating parameters and/or last set of configuration settings may be extracted from the device 200 by the personalizable battery 150 at regular intervals, continuously, and/or as a response to specific predefined stimuli. After extraction, the communications manager 240 may determine whether to store the data temporarily or relay the operating parameters and/or last set of configuration settings to the access point 160. The predefined stimuli may include insertion or removal of the personalizable battery 150, the detection of parametric triggers or the changing of any configuration settings. Transmission of configuration settings to configure the device may occur responsive to insertion of the personalizable battery 150 into the device 200.

In some cases, the UE 180 may receive the operating parameters and/or last current set of configuration settings and execute one or more applications based on the operating parameters and/or last current set of configuration settings. As such, the UE 180 may include processing circuitry that may be similar in capability and perhaps also structure to the processing circuitry described above. The UE 180 may execute applications for storage and/or analysis of the operating parameters and/or last current set of configuration settings. The UE 180 may also be configured to execute an application for reviewing, monitoring, and/or changing individual device or user profiles or specific configuration settings. In some cases, the applications at the UE 180 may include an application for cloud-based fleet management of tools. Thus, for example, adaptive tool settings, instructions and/or the like may be used to specifically configure tools under specifically identified circumstances or scenarios to maximize control over, for example, a fleet of tools.

As can be appreciated from the example embodiments above, some embodiments may provide a personalizable battery 150 that can extract operating parameters and a last current set of configuration settings to define configuration settings to be duplicated or otherwise provided for any of a number of devices to which the personalizable battery 150 is operably connectable (e.g., the device 200).

Figure 4:
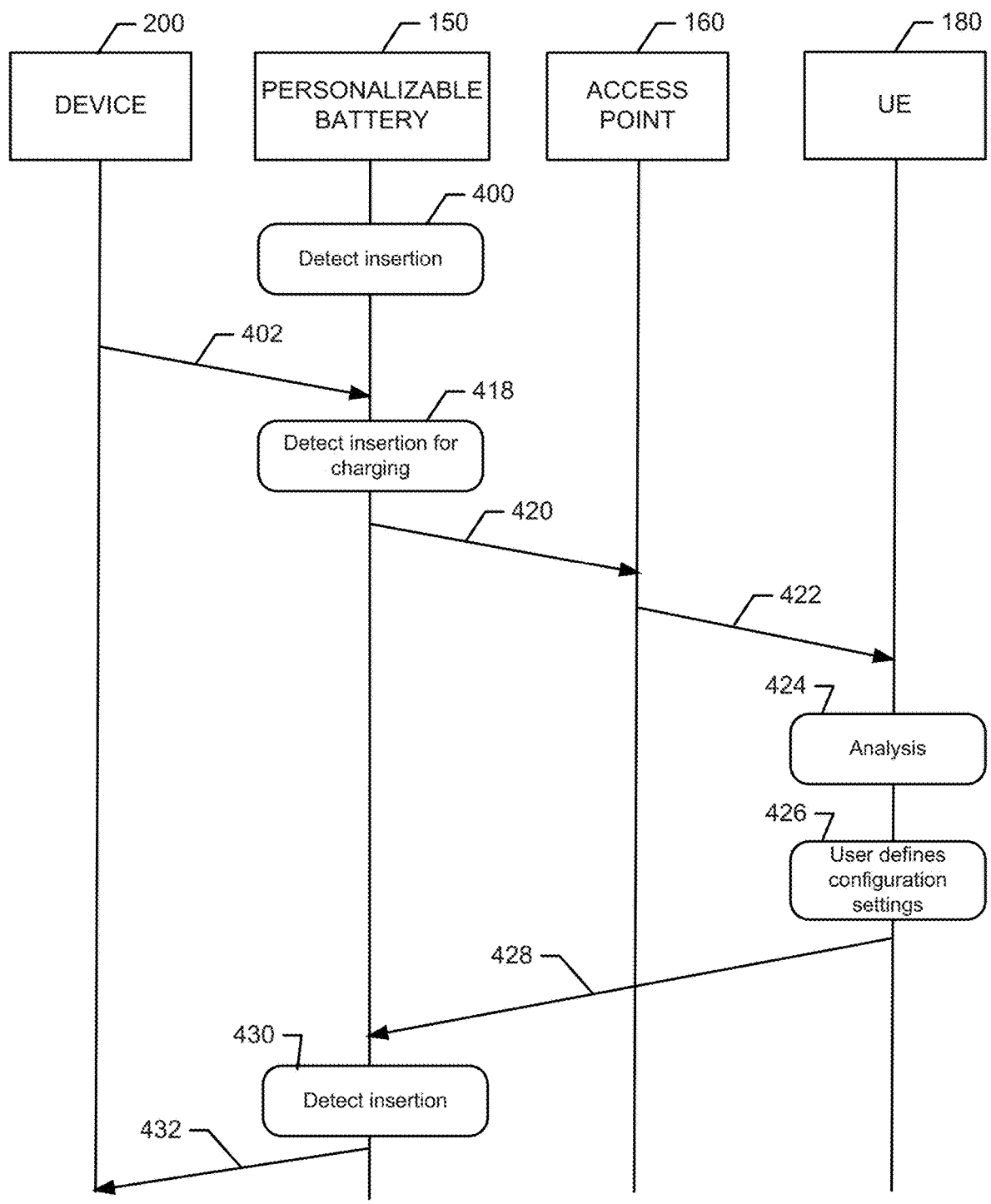
FIG. 4 illustrates a control flow diagram for generating configuration settings remotely for a personalizable battery in accordance with an example embodiment.
Figure 5:
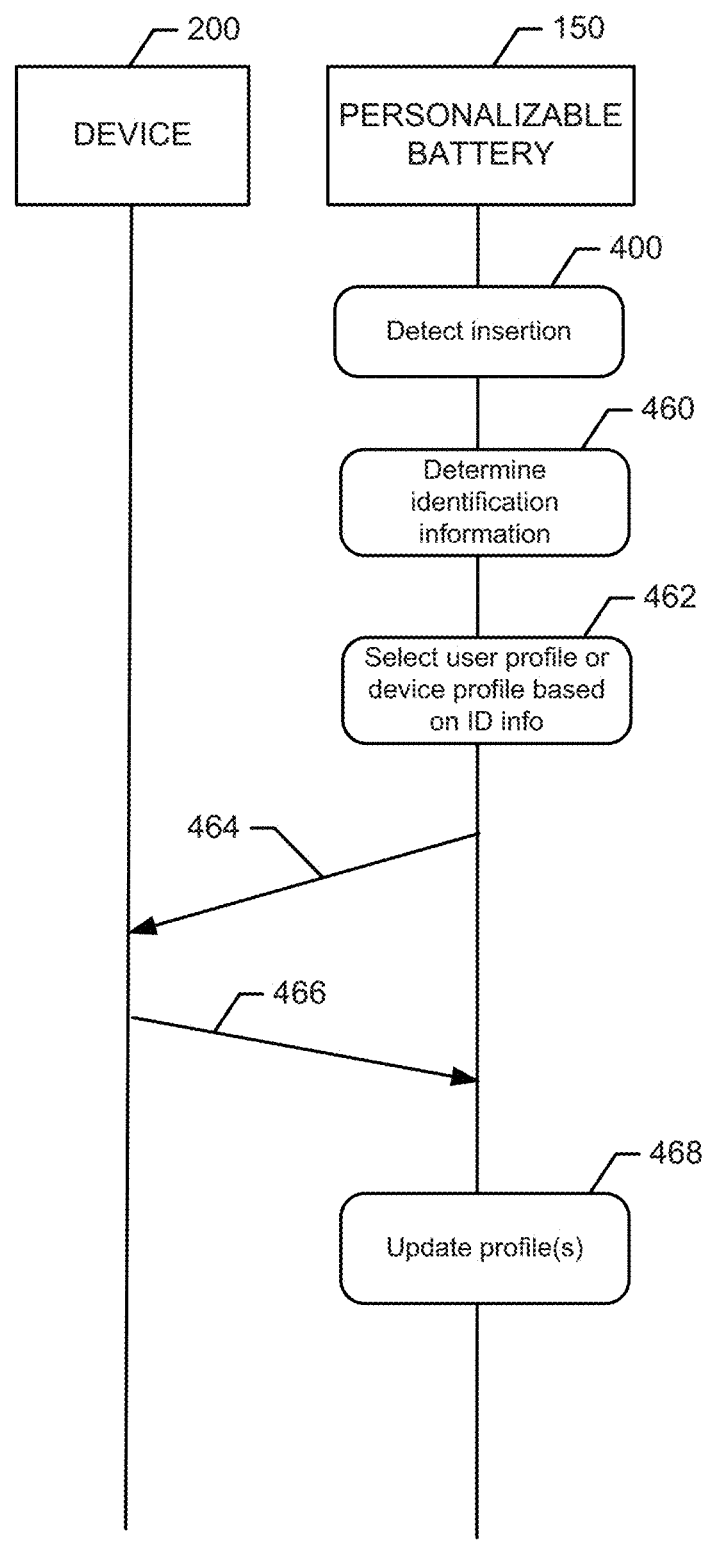
FIG. 5 illustrates a control flow diagram for employment of the personalizable battery to select, generate or update profiles in accordance with an example embodiment.

FIGS. 3-5 illustrate various example control flow diagrams illustrating a series of communication operations associated with operation of the personalizable battery 150 of an example embodiment. As shown in FIG. 4, the personalizable battery 150 may initially detect insertion into the device 200 at operation 400. Thereafter, operating parameters and current configuration settings may be extracted from the device 200 by the personalizable battery 150 at operation 402. At some later time, the user may make a change in configuration settings at operation 404. The personalizable battery 150 may extract information indicative of the changed settings at operation 406. At operation 408, the personalizable battery 150 may detect removal of the personalizable battery 150 from the device 200 and store or update the applicable profile(s). Thereafter, another insertion event may be detected at operation 410. If the insertion is into the device 200 again, then the personalizable battery 150 may provide configuration settings to the device 200 (e.g., to restore the last current set of configuration settings or to provide new configuration settings if the user made changes or active/dynamic changes occurred to the configuration settings at operation 412. If the insertion was instead into a different device of the same type, then the same configuration settings sent that would be sent via operation 412 may be sent to the different device 450 at operation 414. However, if the different device 450 is of a different type, then the configuration settings sent would be a different set of configuration settings (corresponding to the device type and/or specific user profile that is applicable) at operation 416.

In the example of FIG. 4, the personalizable battery 150 may initially detect insertion into the device 200 at operation 400. Thereafter, operating parameters and current configuration settings may be extracted from the device 200 by the personalizable battery 150 at operation 402. The personalizable battery 150 may thereafter be removed from the device 200 and installed in the charger 140 at operation 418. Operating parameters and/or the last set of current configuration settings may be relayed in association with a user profile and/or device profile at operation 420 to the access point 160, which may then relay such information to the UE 180 (e.g., via the network 170) at operation 422. The UE 180 may perform analysis at operation 424, and may generate a displayable output of current configuration settings. The user may interact with the configuration settings to define configuration settings at operation 426. The configuration settings may be provided back to the personalizable battery 150 at operation 428. When insertion is again detected at operation 430, the configuration settings may be provided to the device 200 at operation 432.

In the example of FIG. 5, the personalizable battery 150 may initially detect insertion into the device 200 at operation 400. Thereafter, the personalizable battery 150 may determine identification information of the user or device at operation 460. At operation 462, the user profile or device profile applicable to the identification information is accessed. Thereafter, at operation 464, configuration settings for the determined identification information may be provided to the device 200. Any configuration changes made (as long as the personalizable battery 150 is in the learning mode) may be provided back to the personalizable battery 150 at operation 466. The applicable user or device profile may then be updated at operation 468.

As an example involving a chainsaw, the personalizable battery 150 may be installed into the chainsaw. The personalizable battery 150 may detect insertion into the chainsaw and determine identification information of the user and determine a user profile or device profile applicable to the identification information. Based on the user profile or device profile, the preferred carburetor settings and chain brake settings for the user may be determined and corresponding adjustments may be made. Thus, for example, the operating RPM and the chain brake sensitivity may be adjusted, etc. If the user makes any adjustments during operations, the settings adjusted may be stored to the user profile or device profile.

As another example, involving a riding lawnmower, the personalizable battery 150 may be installed into the riding lawnmower. The personalizable battery 150 may detect insertion into the riding lawnmower and determine identification information of the user and determine a user profile or device profile applicable to the identification information. In some cases, the weight in the seat may be used to determine the identification information. Based on the user profile or device profile, the preferred seat configuration and deck height settings for the user may be determined and corresponding adjustments may be made. Thus, for example, the seat position and deck height may be adjusted, etc. If the user makes any adjustments during operations, the settings adjusted may be stored to the user profile or device profile.

Accordingly, in one example embodiment, a battery pack configured to power any of a plurality of different outdoor power equipment device types is provided. The battery pack may include one or more rechargeable battery cells configured to power a device to which the battery pack is operably coupled (e.g., mated with, installed in, inserted in, plugged in, etc.), and processing circuitry. The processing circuitry may include at least a processor and memory. The processing circuitry may be configured to enable configuration of the device or another device of a same device type as the device based on a set of configuration settings stored in the memory.

In some cases, modifications or amplifications may further be employed as optional alterations or augmentations to the description above. These alterations or augmentations may be performed exclusive of one another or in any combination with each other. In some cases, such modifications or amplifications may include (1), the set of configuration settings is generated based on extraction of operating parameters or last current configuration settings from the device to which the battery pack is operably coupled. In an example embodiment (2), the operating parameters or the last current configuration settings are communicated to the battery pack responsive to a change in the operating parameters or the last current configuration settings. In some cases (3), the operating parameters or the last current configuration settings are stored at the battery pack responsive to removal (withdrawal, unplugging, uninstalling, etc.) of the battery pack from the device. In some embodiments (4), the set of configuration settings is provided to the device or the other device of the same device type responsive to insertion of the battery pack into the device or the other device of the same device type. In an example embodiment (5), the memory stores a plurality of device profiles providing corresponding sets of configuration settings for each of a plurality of different device types. In some cases (6), a determination of device type is made responsive to insertion of the battery pack into the device, and the set of configuration settings provided to the device corresponds to a selected one of the device profiles. In some embodiments (7), the memory stores a plurality of user profiles providing corresponding sets of configuration settings for each of a plurality of different users. In an example embodiment (8), a determination of user identity is made responsive to insertion of the battery pack into the device, and the set of configuration settings provided to the device corresponds to a selected one of the user profiles. In some cases (9), the determination of user identity is made based on a sensed weight of user. In some embodiments (10), the determination of user identity is made based on user input. In some cases (11), the determination of user identity is made based on electronic communication between the device and the battery pack.

In an example embodiment, some, any or all of modifications/amplifications (1) to (11) may be employed in any combination with each other.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A battery pack comprising:
    at least one rechargeable battery cell configured to power one of a plurality of outdoor power equipment devices to which the battery pack may be installed; and
    processing circuitry operably coupled to the at least one rechargeable battery cell, the processing circuitry programmed to:
        store, in a memory, a plurality of sets of configuration settings, each set of configuration settings corresponding to a profile within a plurality of profiles, each profile being a device profile or a user profile;
        detect insertion of the battery pack into an outdoor power equipment device of the plurality of outdoor power equipment devices;
        determine identification information indicating a selected profile, the identification information indicating that the selected profile is a device profile for the outdoor power equipment device or the selected profile is a user profile for a user of the outdoor power equipment device;
        retrieve, from the memory, a selected set of configuration settings for the selected profile, the selected set of configuration settings being one of the plurality of sets of configuration settings stored in the memory; and
        transmit, to the outdoor power equipment device, the selected set of configuration settings to configure the outdoor power equipment device to operate in accordance with the selected set of configuration settings.

2. The battery pack of claim 1, wherein the plurality of profiles comprises a plurality of device profiles;
    wherein each device profile within the plurality of device profiles is associated with an outdoor power equipment device type; and
    wherein the processing circuitry is programmed to determine the identification information from the outdoor power equipment device, the identification information indicating the outdoor power equipment device type for the outdoor power equipment device.

3. The battery pack of claim 2, wherein the processing circuitry is programmed to determine the identification information indicating the outdoor power equipment device type in response to insertion of the battery pack into the outdoor power equipment device.

4. The battery pack of claim 1, wherein the plurality of profiles comprises a plurality of user profiles;
    wherein each user profile within the plurality of user profiles is associated with one of a plurality of different users; and
    wherein the processing circuitry is programmed to determine the identification information indicating an identification of the user.

5. The battery pack of claim 4 further comprising a user interface; and
    wherein the processing circuitry is programmed to determine the identification information indicating the identification of the user via a user interaction with the user interface.

6. The battery pack of claim 4, wherein the processing circuitry is programmed to determine the identification information indicating the identification of the user in response to detecting insertion of the battery pack into the outdoor power equipment.

7. The battery pack of claim 4, wherein the processing circuitry is programmed to determine the identification information indicating the identification of the user based on an electronic communication between the outdoor power equipment device and the battery pack.

8. The battery pack of claim 1, wherein the processing circuitry is further programmed to extract current configuration settings from the outdoor power equipment device to which the battery pack is operably coupled for storage with the plurality of sets of configuration settings.

9. The battery pack of claim 8, wherein the processing circuitry programmed to extract the current configuration settings is further programmed to receive the current configuration settings via a communication responsive to a change in the current configuration settings on the outdoor power equipment device.

10. The battery pack of claim 8, wherein the processing circuitry programmed to extract the current configuration settings responsive to initiating removal of the battery pack from the outdoor power equipment device.

11. An outdoor power equipment device comprising:
    an electric motor;
    a working element operably coupled to the electric motor to be powered by the electric motor; and
    a battery pack comprising:
        at least one rechargeable battery cell configured to power the outdoor power equipment device as one of a plurality of outdoor power equipment devices to which the battery pack may be installed; and
        processing circuitry operably coupled to the at least one rechargeable battery cell, the processing circuitry programmed to:
            store, in a memory, a plurality of sets of configuration settings, each set of configuration settings corresponding to a profile within a plurality of profiles, each profile being a device profile or a user profile;
            detect insertion of the battery pack into the outdoor power equipment device;
            determine identification information indicating a selected profile, the identification information indicating that the selected profile is a device profile for the outdoor power equipment device or the selected profile is a user profile for a user of the outdoor power equipment device;
            retrieve, from the memory, a selected set of configuration settings for the selected profile, the selected set of configuration settings being one of the plurality of sets of configuration settings stored in the memory; and transmit, to the outdoor power equipment device, the selected set of configuration settings to configure the outdoor power equipment device to operate in accordance with the selected set of configuration settings.

12. The outdoor power equipment device of claim 11, wherein the plurality of profiles comprises a plurality of device profiles;

wherein each device profile within the plurality of device profiles is associated with an outdoor power equipment device type; and wherein the processing circuitry is programmed to determine the identification information from the outdoor power equipment device, the identification information indicating the outdoor power equipment device type for the outdoor power equipment device.

13. The outdoor power equipment device of claim 12, wherein the processing circuitry is programmed to determine the identification information indicating the outdoor power equipment device type in response to insertion of the battery pack into the outdoor power equipment device.

14. The outdoor power equipment device of claim 11, wherein the plurality of profiles comprises a plurality of user profiles;

wherein each user profile within the plurality of user profiles is associated with one of a plurality of different users; and wherein the processing circuitry is programmed to determine the identification information indicating an identification of the user.

15. The outdoor power equipment device of claim 14, wherein the battery pack further comprises a user interface; and wherein the processing circuitry is programmed to determine the identification information indicating the identification of the user via a user interaction with the user interface.

16. The outdoor power equipment device of claim 14, wherein the processing circuitry is programmed to determine the identification information indicating the identification of the user in response to detecting insertion of the battery pack into the outdoor power equipment device.

17. The outdoor power equipment device of claim 14, wherein the processing circuitry is programmed to determine the identification information indicating the identification of the user based on an electronic communication between the outdoor power equipment device and the battery pack.

18. The outdoor power equipment device of claim 11, wherein the processing circuitry is further programmed to extract current configuration settings from the outdoor power equipment device for storage with the plurality of sets of configuration settings.

19. The outdoor power equipment device of claim 18, wherein the processing circuitry programmed to extract the current configuration settings is further programmed to receive the current configuration settings via a communication responsive to a change in the current configuration settings on the outdoor power equipment device.

20. The outdoor power equipment device of claim 18, wherein the processing circuitry programmed to extract the current configuration settings responsive to initiating removal of the battery pack from the outdoor power equipment device.

* * * * *